(12) United States Patent
Aldrich, III et al.

(10) Patent No.: US 8,055,401 B2
(45) Date of Patent: Nov. 8, 2011

(54) TRANSMISSION AUXILIARY PUMP DIAGNOSIS METHOD AND APPARATUS

(75) Inventors: William L. Aldrich, III, Davisburg, MI (US); Donald D. Crites, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 495 days.

(21) Appl. No.: 12/360,170

(22) Filed: Jan. 27, 2009

(65) Prior Publication Data

US 2010/0191402 A1      Jul. 29, 2010

(51) Int. Cl.
*G01M 17/00* (2006.01)
*B60W 20/00* (2006.01)

(52) U.S. Cl. ........ 701/29; 180/65.275; 417/63; 702/183

(58) Field of Classification Search ................ 73/115.01, 73/115.02; 180/65.265, 65.275; 340/438; 417/53, 63; 701/22, 29, 31, 33; 702/60, 702/64, 65, 182, 183
See application file for complete search history.

(56) References Cited

U.S. PATENT DOCUMENTS

| | | | |
|---|---|---|---|
| 7,267,090 B2 | 9/2007 | Tamai et al. | |
| 7,465,250 B2 * | 12/2008 | Tamai et al. | 477/3 |
| 7,497,800 B2 * | 3/2009 | Sakata et al. | 475/136 |
| 7,544,151 B2 * | 6/2009 | Zettel et al. | 477/160 |
| 7,556,120 B2 * | 7/2009 | Sah et al. | 180/305 |
| 2009/0024264 A1 * | 1/2009 | Aldrich et al. | 701/22 |
| 2009/0112421 A1 * | 4/2009 | Sah et al. | 701/59 |
| 2009/0118954 A1 * | 5/2009 | Wu et al. | 701/60 |
| 2009/0192685 A1 * | 7/2009 | Sime | 701/60 |
| 2010/0217470 A1 * | 8/2010 | Aldrich et al. | 701/29 |
| 2010/0279816 A1 * | 11/2010 | Soliman | 477/3 |
| 2010/0288570 A1 * | 11/2010 | Tarnowsky et al. | 180/65.265 |
| 2011/0106351 A1 * | 5/2011 | Sah et al. | 701/22 |
| 2011/0144846 A1 * | 6/2011 | Zollner et al. | 701/22 |

* cited by examiner

*Primary Examiner* — Paul N Dickson
*Assistant Examiner* — Laura Freedman
(74) *Attorney, Agent, or Firm* — Quinn Law Group, PLLC

(57) ABSTRACT

A method includes diagnosing a transmission auxiliary pump in a hybrid electric vehicle (HEV) having an engine and an auxiliary power module (APM). A predetermined HEV operating mode is detected during which the engine is running, and the pump is cycled between on and off states. An electrical output value of the APM is determined during the on and off states. A control action is executed when the output value exceeds a corresponding threshold. An HEV includes an engine, a transmission, an APM, a battery connected to the APM, and a transmission auxiliary pump. An algorithm diagnoses operation of the pump. The APM includes an algorithm for diagnosing the pump during a predetermined mode during which the engine is running by determining an electrical output value of the APM during on and off states of the pump, and executes a control action when the output value exceeds a threshold.

14 Claims, 3 Drawing Sheets

TRANSMISSION AUXILIARY PUMP DIAGNOSIS METHOD AND APPARATUS

TECHNICAL FIELD

The present invention relates generally to vehicle system diagnostics, and in particular to the on-board testing and diagnosis of a transmission auxiliary pump operable for maintaining pressure in a transmission of a hybrid electric vehicle during certain operating modes.

BACKGROUND OF THE INVENTION

Hybrid electric vehicles or HEV can selectively utilize different energy sources as needed in order to achieve optimal fuel economy. A typical HEV can use an internal combustion engine as a primary vehicle propulsion mechanism, and a high-voltage battery module or energy storage system (ESS) for restarting the engine and/or for electrical propulsion of the HEV. For example, an HEV having a typical full hybrid powertrain can be propelled via purely electrical means up to a threshold speed, with one or more motor/generators drawing power from the ESS as needed. Above the threshold speed, the engine can provide some or all of the required propulsive torque. By way of contrast, an HEV having a limited hybrid powertrain lacks means for electrical propulsion, but retains certain functionality such as regenerative braking capability and the selectively powering off or shutting down of the engine at idle; fuel-saving performance capabilities that are generally shared with the full hybrid design.

The ability of an HEV to automatically shutdown the engine is a capability referred to hereinafter as "Auto Stop" functionality, which allows otherwise wasted fuel to be conserved during certain vehicle conditions. In vehicles having Auto Stop functionality, a motor/generator also referred to as a belt alternator starter (BAS) is used in lieu of a conventional alternator to apply torque to a serpentine belt of the engine whenever a driver signals intent to resume travel from an Auto Stop state. Torque from the BAS can turn the engine for a transient duration until a flow of fuel from the vehicle fuel supply can be restored.

During an Auto Stop state, components normally driven by the engine no longer operate. The main hydraulic pump for transmissions requiring pressurized oil to maintain clutch pressure and air conditioning compressor pumps driven by the engine's serpentine belt are two examples. During an Auto Stop event, a transmission auxiliary pump can be automatically energized in order to provide oil pressure to the transmission that would normally be supplied by the engine-driven transmission pump. Additionally, if the air conditioning (A/C) compressor is driven via the engine's serpentine belt, the A/C compressor is by necessity disabled during the Auto Stop event.

However, under some circumstances it may not be desirable to disable HVAC devices, such as during an active defrost mode, when the ambient temperature and/or humidity is relatively high, and/or when the driver of the HEV manually overrides Auto Stop functionality. The requirement to maintain engine operation for HVAC or other vehicle performance issues can complicate the diagnosing of the transmission auxiliary oil pump since the engine-driven oil pump is operational. Enabling the auxiliary oil pump while the engine is rotating combines the output of both pumps, and does not offer a clear indication of the auxiliary pump's output alone. Conventional methods of diagnosing an auxiliary pump include forcing an Auto Stop event to execute, allowing Auto Stop during all A/C modes, and/or using a pressure switch in conjunction with the HEV ignition to automatically test the auxiliary pump whenever the ignition switch is turned off. Each of these alternatives can be less than optimal, as they each involve either or both of shutting down the engine and the use of additional hardware.

SUMMARY OF THE INVENTION

Accordingly, a method is provided for diagnosing a transmission auxiliary pump in a hybrid electric vehicle (HEV) when Auto Stop functionality is prevented, overridden, or when the engine otherwise remains running. Additionally, the method may be used during the shut down or powering off of the HEV without the need for a dedicated pressure switch. Rather than adding dedicated and costly circuitry to measure the electrical power usage of the auxiliary pump alone, the auxiliary pump is instead diagnosed based on a detected change in an electrical power output from an Auxiliary Power Module (APM) as the auxiliary pump is cycled on and off. The electrical power output from the APM feeds the vehicle's auxiliary or low voltage power requirements, and is typically already monitored. The method, which can be executed via an algorithm in accordance with the invention, can diagnose an auxiliary pump electrical load that is too high, a condition that might be indicative of a stalled auxiliary pump or blocked hydraulic passage, or an auxiliary pump electrical load that is too low, e.g., an open or low pressure condition in the auxiliary pump circuit. This level of diagnosis can be accomplished even though there may be many additional, varying electrical loads reflected in the APM output signal.

The method determines the difference in APM power output between a power-on mode and a power-off mode of the auxiliary pump to thereby provide useful signal-to-noise information. The method also rejects influences of other periodic electrical loads in the HEV, which could otherwise alias the auxiliary pump power signal and induce false pass or false fail results while the diagnosis is still in progress. Execution of the method can occur during any suitable HEV operating mode, such as during idle when Auto Stop functionality is prevented, or during powering down of the HEV. The method eliminates the need for execution of a conventional forced Auto Stop event solely for the purpose of diagnosing proper function of the auxiliary pump, thus allowing the automatic or manual override Auto Stop event as needed or desired.

In particular, a method of diagnosing a transmission auxiliary pump in a hybrid electric vehicle (HEV) having an engine and an auxiliary power module (APM) includes detecting a predetermined HEV operating mode during which the engine is running, cycling the auxiliary pump between an on state and an off state during the predetermined HEV operating mode, and determining an electrical output value of the APM during each of the on state and the off state. A control action is executed when the electrical output value, and/or another value determined using the electrical output value, exceeds a corresponding calibrated threshold.

A hybrid electric vehicle (HEV) includes an engine, a transmission configured to receive an input torque from the engine, an auxiliary power module (APM), an auxiliary battery that is electrically connected to the APM, and a transmission auxiliary pump. The APM includes or has access to an algorithm for diagnosing proper function of the auxiliary pump during a predetermined HEV operating mode during which the engine is running. The algorithm determines an electrical output value of the APM, such as an APM power output value, during each of an on state and the off state of the auxiliary pump, and then executes a control action when the electrical output value or another value determined using the electrical output value exceeds a corresponding calibrated threshold.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
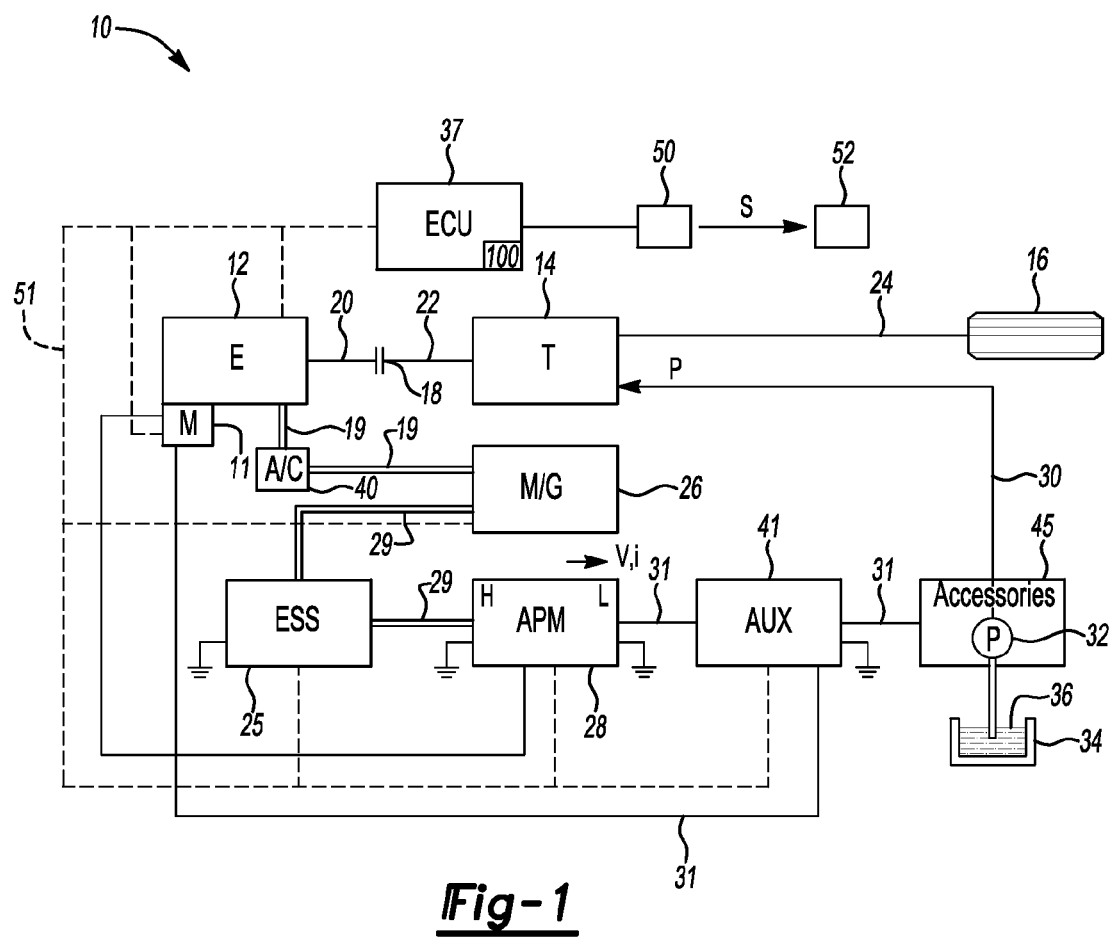
FIG. 1 is a schematic illustration of a hybrid electric vehicle (HEV) having Auto Stop capability and a transmission auxiliary pump in accordance with the invention.

Referring to the drawings wherein like reference numbers correspond to like or similar components throughout the several figures, and beginning with FIG. 1, a hybrid electric vehicle (HEV) 10 includes an internal combustion engine (E) 12 having a starter motor (M) 11 operable for starting the engine 12 during an initial start up of the HEV 10, an output member 20, and a transmission (T) 14 having an input member 22. The output member 20 of the engine 12 can be selectively connected to the input member 22 of the transmission 14 via a torque transfer mechanism or a clutch device 18, a hydrodynamic torque converter, or other suitable means. The transmission 14 can be an electrically variable transmission or EVT or any other suitable transmission design capable of transmitting propulsive torque to a set of road wheels 16 via a transmission output member 24.

The HEV 10 includes an electric motor/generator (M/G) 26 that is electrically connected to a high-voltage battery or energy storage system (ESS) 25 via a high-voltage bus or connection 29. The motor/generator 26 is adapted for use in a belt alternator starter (BAS) system. When configured in this manner, the motor/generator 26 can rotate a serpentine belt 19 of the engine 12. When the motor/generator 26 is used in this manner, torque on the belt 19 rotates the output member 20 of the engine 12 as needed after an Auto Stop event, as described below. An air conditioning (A/C) compressor 40 can also be selectively connected to the belt 19 via an internal clutch (not shown), with the A/C compressor 40 driven or energized in conjunction with the belt 19.

Although not shown in FIG. 1, those of ordinary skill in the art will recognize that the HEV 10 of FIG. 1 can also be configured as a full hybrid within the scope of the invention, i.e., the ESS 25 can also be used to selectively propel the HEV 10 by supplying electrical power to the motor/generator 26, which in turn drives the transmission 14 in an electric mode. The ESS 25 can be recharged via the motor/generator 26 when the motor/generator 26 is operating in its capacity as a generator, for example during a regenerative braking event.

The HEV 10 further includes an auxiliary power module or APM 28 which is electrically connected to the ESS 25 via high-voltage bus 29, and to a low-voltage or auxiliary battery (AUX) 41 via a low-voltage bus 31. The APM 28 can be configured as a DC-DC converter adapted to convert a supply of DC power from a high voltage level to a low voltage level, and vice versa, as determined by an electronic control unit (ECU) 37. That is, the APM 28 is operable for converting a relatively high voltage from the ESS 25 to a lower voltage level suitable for charging the auxiliary battery 41, and for supplying the HEV 10 with low voltage power requirements. The auxiliary battery 41 is a relatively low-voltage device, such as a 12-volt battery, suitable for powering one or more auxiliary systems or accessories 45 aboard the HEV 10, including a transmission auxiliary pump ($P_{AUX}$) 32. Additional auxiliary systems or accessories 45 can include, by way of example, headlights, interior lights, radio or other audio devices, etc.

Still referring to FIG. 1, the ECU 37 is electrically connected to or otherwise in communication with each of the engine 12, the starter motor 11, the motor/generator 26, the ESS 25, the APM 28, and the auxiliary battery 41 via a control channel 51, e.g., a hard wired or wireless control link or path suitable for transmitting and receiving the necessary electrical control signals for proper power flow coordination within the HEV 10. The ECU 37 includes a microprocessor unit that receives and processes various vehicle operating values including an APM voltage output (V) and an APM current output (i). The ECU 37 can be configured as a distributed or a central control module having such control modules and capabilities as might be necessary to execute all required power flow control functionality aboard the HEV 10 in the desired manner.

Additionally, the ECU 37 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the ECU 37 or accessible thereby, including the algorithm 100, can be stored in ROM and executed to provide the respective functionality.

As used herein, the term "Auto Stop" refers to the ability of the HEV 10 to selectively shut down or power off the engine 12 when the HEV 10 is at a standstill, such as while waiting at an intersection, in traffic, or when otherwise determined by the ECU 37. In this manner, the HEV 10 is able to minimize idle fuel consumption. During an Auto Stop event, the auxiliary pump 32 can be energized via the APM 28 and the auxiliary battery 41 in order to maintain a sufficient amount of pressure within the transmission 14. The auxiliary pump 32 draws fluid 36 from a reservoir or sump 34, and supplies the fluid 36 under pressure (arrow P) to the transmission 14 via a fluid passage 30. When Auto Stop functionality is automatically or manually disabled, fluid pressure to the transmission 14 is provided via an engine-driven main pump (not shown) in the conventional manner.

The power output of the APM 28 can be monitored to measure, sense, detect, or otherwise determine the APM output voltage (V) and the APM output current (i), from which the ECU 37 can calculate an APM output power. Within the scope of the invention, the ECU 37 includes or has access to an algorithm 100, described below with reference to FIG. 2, which allows for the diagnosis of an operation of the auxiliary pump 32 based on a measured or calculated change in the APM output power. The power requirement of an electrical pump is proportional to the pump's load and the amount of work the pump performs. The auxiliary pump 32 drives a relatively constant load at fixed pressure in the transmission 14. Consequently, the electrical equivalent of the work performed by the auxiliary pump 32, measured in watts (W), can be calculated. This expected work provides an acceptable range of power usage that indicates a correctly operating pump.

The algorithm 100 can diagnose a condition or state in which the load on the APM is too high or too low, which can correspond respectively to a stalled auxiliary pump 32 or an open or low pressure signal to the auxiliary pump 32. The algorithm 100 can therefore run without using a conventional pressure feedback signal when an ignition switch (not shown) is turned off, and without requiring that an Auto Stop event be performed to diagnose operation or performance of the auxiliary pump 32.

Figure 2:
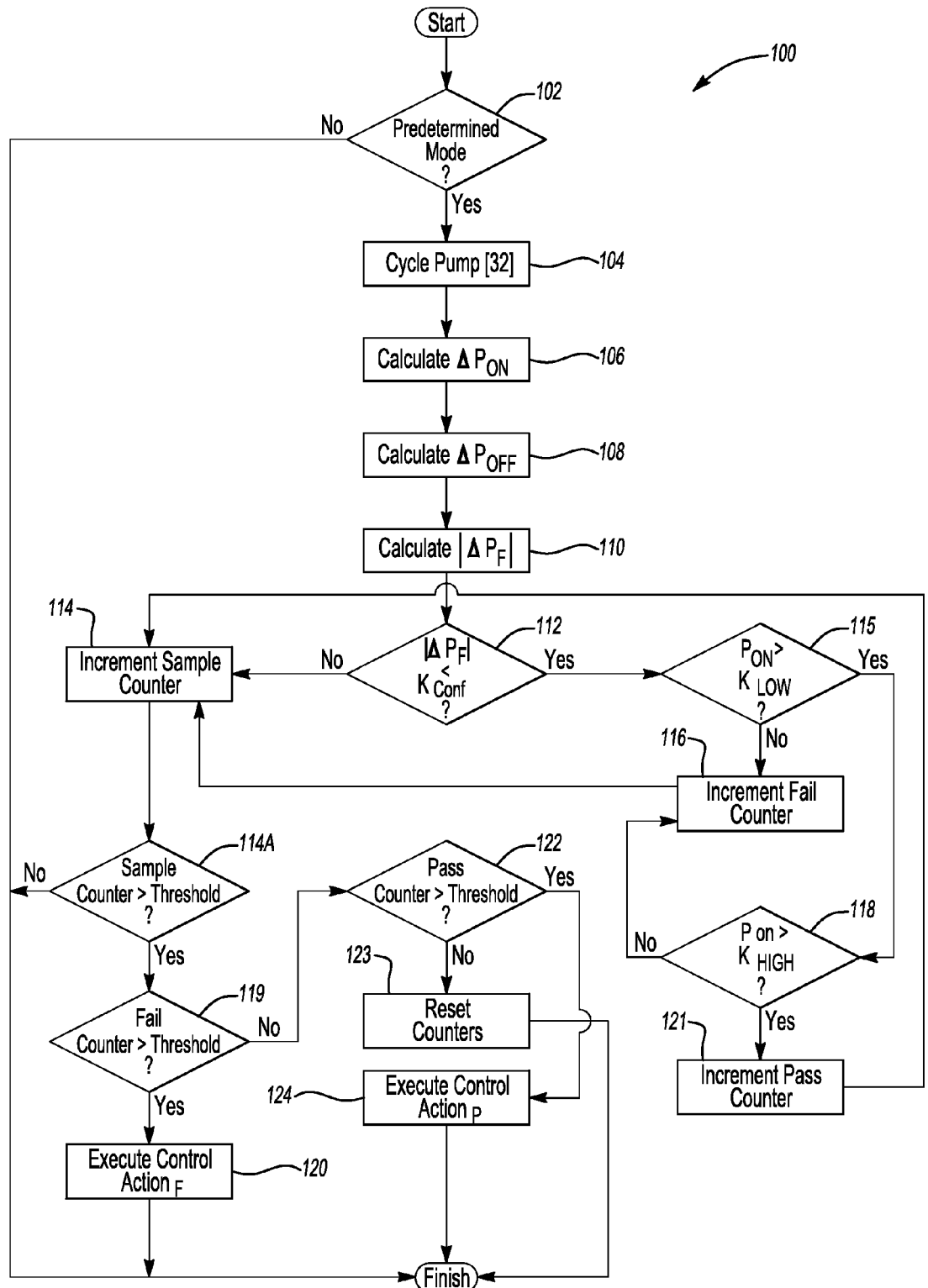
FIG. 2 is a graphical flow chart describing a method of diagnosing the transmission auxiliary pump of the HEV in FIG. 1.

Referring to FIG. 2, and with reference to the various components and structure of the HEV 10 of FIG. 1, the algorithm 100 begins at step 102, wherein the occurrence or presence of a predetermined HEV state or operating mode is determined. As used herein, a suitable predetermined HEV operating mode is present when the engine 12 is running. In one embodiment, the predetermined HEV operating mode is present when the engine 12 is running at idle, such as would occur when Auto Stop functionality is temporarily prevented or overridden, either manually by a user of the HEV 10 or automatically via predetermined component request. In another embodiment, the predetermined HEV operating mode is present when the HEV 10 is operating in a shut-down or power down mode.

In the first embodiment, i.e., when the engine 12 is running at idle, a lower fidelity signal may result due to a potentially noisy APM power output, but with the benefit of a greater possible number of sample periods as described below. In the second embodiment, i.e., during shut down or power down mode, signal fidelity can be higher due to a majority of the auxiliary systems 45 being off, but with fewer sample periods being possible without extending the duration of the power down sequence. The two embodiments described hereinabove are exemplary, and are not intended to be mutually exclusive. Therefore, sample data can be drawn during either or both of idle and shut-down as needed, and/or during other suitable modes during which the engine 12 remains running. Regardless of the particular embodiment, if at step 102 it is determined that a predetermined HEV operating mode is not present, the algorithm 100 is finished. Otherwise, the algorithm 100 proceeds to step 104.

At step 104, the algorithm 100 automatically toggles or cycles the power supplied by the auxiliary battery 41 to the auxiliary pump 32 at a predetermined rate, with the rate determining the sample period as used hereinbelow. Step 104 occurs as many times as is needed to collect sufficient sample data for the required number of samples, with at least two on/off cycles required for the collection of a set of on/off data points. The algorithm 100 then proceeds to step 106.

At step 106, a first and a second power output value of the APM 28 are measured, detected, calculated, or otherwise determined with the auxiliary pump 32 being energized or turned on. That is, for each sample period, a pair of power-on measurements P0, P1 are determined, as exemplified below with reference to FIG. 3, and the power-on difference ($\Delta P_{ON}$) is calculated, i.e., $\Delta P_{ON}$=P1−P0. Again referring to FIG. 3 at time t0, the instantaneous output power at the APM 28 is sampled, resulting in P0, and then the auxiliary pump 32 is immediately commanded on. At time t1, the APM power is again sampled, resulting in P1. The time between states t0 and t1 needs to be minimized as much as possible, and should only be long enough to allow the APM output to reflect the change in power due to the auxiliary pump 32 being commanded on. The typical time between states t0 and t1 would be approximately 100 ms. The power-on difference ($\Delta P_{ON}$) result is temporarily stored in memory within the ECU 37 or accessible thereby, and the algorithm 100 proceeds to step 108.

At step 108, a third and a fourth power output value of the APM 28 are measured, detected, calculated, or otherwise determined with the auxiliary pump 32 de-energized or turned off. That is, for each sample period, a pair of power-off measurements P2, P3 are determined, again as exemplified below with reference to FIG. 3, and the power-off difference ($\Delta P_{OFF}$) is calculated, i.e., $\Delta P_{OFF}$=P2−P3. The power measurements for P2 and P3 occur at the t2 and t3 states respectively. As soon as P2 is sampled, the auxiliary pump 32 is immediately commanded off. As described above for t0 and t1, the duration between the states needs to be minimized as much as possible to reduce spurious load changes influencing the power measurement. The power-off difference ($\Delta P_{OFF}$) result is temporarily stored in memory within the ECU 37, and the algorithm 100 proceeds to step 110.

At step 110, an absolute value final power difference ($\Delta P_F$) according to the formula $\Delta P_F = |\Delta P_{ON} - \Delta P_{OFF}|$, with the value of the power-on difference ($\Delta P_{ON}$) determined above at step 106 and the value of the power-off difference ($\Delta P_{OFF}$) being determined above at step 108. Once the absolute value of the final power difference ($\Delta P_F$) is determined, the algorithm 100 proceeds to step 112.

At step 112, the value of the final power difference ($\Delta P_F$) from step 110 is compared to a calibrated confidence value or a threshold value, represented in FIG. 2 as $K_{CONF}$, in order to determine whether another electrical load changed state during the pump power sampling periods, thus causing the result to be aliased. For example, if there were only the auxiliary pump 32 reflected in the APM 28 output signal, the value of the final power difference ($\Delta P_F$) would always equal near zero, i.e., the increase in power consumption to turn the electrical load on would exactly match the decrease in power when the same electrical load is later turned off.

However, for exemplary purposes, if while turning on the desired electrical load another electrical load also turns on during the same sample period, the power-on difference ($\Delta P_{ON}$) would include both electrical loads, and would therefore be higher than normal. When the desired electrical load is turned off, there would be a resultant power decrease, but the decrease would not match the value of the power-on difference ($\Delta P_{ON}$) determined above at step 106. Consequently, the final power difference ($\Delta P_F$) signal would be relatively large, as described below with reference to sample C of FIG. 3. The above described example of an additional output turning on during the "pump on" command can be expanded to include any on or off state change by any but the desired load during the sample periods defined by the duration between $t_0$ and $t_1$ for power-on, and between t2 and t3 for power-off. Since the final power difference ($\Delta P_F$) represents absolute power, aliased data will always be represented by a calculated value of ($\Delta P_F$) greater than a threshold.

Therefore, at step 112, if the final power difference ($\Delta P_F$) is less than a predetermined or calibrated threshold ($K_{CONF}$), this result indicates that the sample data is not aliased by another electrical load being enabled or disabled during the same sample, and the magnitude of the power-on difference ($\Delta P_{ON}$) can be used to pass or fail the diagnostic, as described below. If the value of the final power difference ($\Delta P_F$) is less than the calibrated threshold ($K_{CONF}$), the algorithm 100 proceeds to step 115 to determine a pass or fail count. Otherwise, the algorithm 100 proceeds to step 114 because the data is aliased.

At step 114, the algorithm 100 includes increasing or incrementing the value of a sample counter, i.e., a digital or analog counting device that records or stores an integer value corresponding to the total executed number of prior test cycles or data samples. The algorithm 100 then proceeds to step 114A, wherein the present value of the sample counter is compared to a threshold number of samples. If the present value exceeds the threshold number of samples, the algorithm 100 proceeds to step 119 to check for a diagnostic fail. If the sample counter does not exceed the threshold number of samples, the algorithm 100 is finished until the next sample occurs.

At step 115, the value of the power-on difference ($\Delta P_{ON}$) from step 106 is compared to a threshold lower limit, represented in FIG. 2 as $K_{LOW}$. If the value of the power-on difference ($\Delta P_{ON}$) does not exceed the calibrated lower threshold ($K_{LOW}$), the algorithm 100 proceeds to step 116. Otherwise, the algorithm 100 proceeds to step 118.

At step 116, the algorithm 100 increases or increments the value of a fail counter, i.e., a digital or analog counting device that records or stores a value corresponding to the number of test cycles or data samples resulting in a failing value. The algorithm 100 then proceeds to step 114 described above.

At step 118, the value of the power-on difference ($\Delta P_{ON}$) from step 106 is compared to a threshold upper limit, represented in FIG. 2 as $K_{HIGH}$. If the value of the power-on difference ($\Delta P_{ON}$) is less than the threshold upper limit ($K_{HIGH}$), the algorithm 100 proceeds to step 121 to increment a diagnostic pass counter. Otherwise, the algorithm 100 proceeds to step 116 to increment a diagnostic fail counter.

At step 119, the present value of the fail counter can be compared to a predetermined threshold number. If the fail counter exceeds the predetermined threshold number, the algorithm 100 proceeds to step 120. Otherwise, the algorithm 100 proceeds to step 122 to determine if a sufficient number of pass counts have occurred to indicate a diagnostic pass.

At step 120, the algorithm 100 executes a suitable control action (CONTROL ACTION$_F$) in response to a determination at step 119 that a predetermined or calibrated maximum number of failed diagnoses samples have occurred. That is, when the fail counter incremented at step 116 finally reaches a predetermined maximum number, one or more suitable control actions can be automatically executed. For example, a diagnostic fault code can be recorded that can be accessed by a technician during maintenance of the HEV 10 in order to facilitate corrective action. The pass, fail, and sample counts are reset at this point. Algorithm 100 is then finished until the next sample occurs.

At step 121, the algorithm 100 increases or increments the value of a pass counter, i.e., a digital or analog counting device that records or stores a value corresponding to the number of test cycles or data samples resulting in a passing value. The algorithm 100 then proceeds to step 114.

At step 122, the present value of the pass counter can be compared to a predetermined threshold number. If the pass counter exceeds the predetermined threshold number, the algorithm 100 proceeds to step 124. Otherwise, the diagnostic is indeterminate, the prerequisite number of samples have been logged, but neither number of fail or pass samples have been accrued. This condition will occur if many of the samples are discarded because they are aliased. In response, the algorithm 100 proceeds to step 123. Otherwise, the algorithm 100 proceeds to step 124.

At step 123, the pass, fail, and sample counts are reset. Algorithm 100 is then finished until the next sample occurs.

At step 124, the algorithm 100 executes a suitable control action (CONTROL ACTION$_P$) in response to a determination at step 122 that a predetermined or calibrated maximum number of passed diagnoses samples have occurred. That is, when the pass count or pass sample counter reaches a predetermined maximum number and ratio of the values of the pass counter and sample counter is greater than a threshold, one or more suitable passing control actions can be automatically executed. For example, the diagnostic may be passed and previously logged failure may be cleared. If the number of sample counts exceeds the threshold but the ratio is not greater than the threshold, the diagnostic state is indeterminant. For this condition, the sample, fail and pass counts may all be reset. Algorithm 100 is then finished until the next sample occurs.

Alternately, the diagnostic fault code can be automatically transmitted as a signal (arrow S) to a remote location 52 via an optional vehicle telematics unit 50, as shown in phantom in FIG. 1. Other suitable control actions can include the selective illumination or activation of an indicator device positioned in the interior of the HEV 10, e.g., a warning lamp, text message, and/or an audio signal suitable for alerting the driver of the HEV 10 to a potential performance issue with the auxiliary pump 32.

Figure 3:
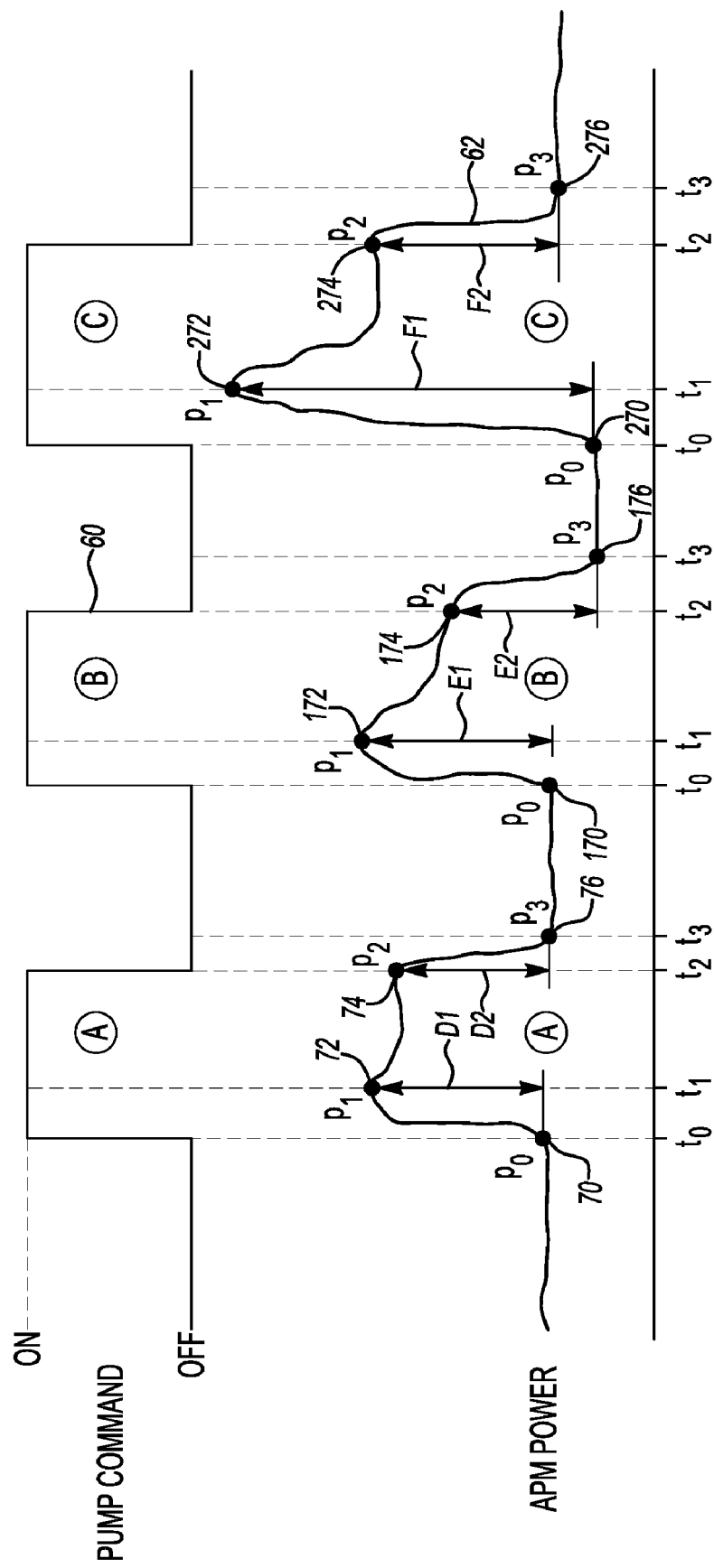
FIG. 3 is a graphical illustration describing a representative set of diagnostic data for the HEV of FIG. 1.

Referring to FIG. 3, a representative set of basic diagnostic data includes a pump command signal 60 and an APM power output signal 62 each plotted as a function of time (t) along the x-axis. The pump command signal 60 is a discrete on/off signal, while the APM power output signal 62 varies in response to the output voltage and current of the APM 28. Three samples are shown in FIG. 3, with the respective samples labeled A, B, and C.

Sample A describes a "normal" or expected result in a typical system that does not include an additional load change near the sample periods. APM output power at point 70 is at a minimum with the auxiliary pump 32 off. At t=0, the auxiliary pump 32 is turned on, and APM output power value rises to the level of point 72 at t=1. Points 70 and 72 therefore represent the first and second data points measured with the auxiliary pump 32 turned on. The difference between these values is the power-on difference ($\Delta P_{ON}$) determined at step 106 and described above with reference to FIG. 2. The power-off data points are likewise represented by points 74 and 76, when the auxiliary pump 32 is turned off starting at t=2. A comparison in the changes in power, i.e., arrows D1 and D2, shows a final power difference ($\Delta P_F$) of a normal or expected amount, which can be used as a baseline when referring to samples B and C.

Sample B describes a scenario in which an additional electrical load is placed on the APM 28, but not during the sample periods. APM output power at point 170 is at a minimum with the auxiliary pump 32 turned off. At t0, the auxiliary pump 32 is turned on, and APM output power rises to the level of point 172 at t1. Points 170 and 172 therefore represent the first and second data points measured with the auxiliary pump 32 turned on, and with an additional load on the APM 28 in addition to the auxiliary pump 32. Sometime after t1, but before t2, an additional electrical load is disabled resulting in a net power decrease at the APM 28. The power off data points are likewise represented by points 174 and 176, when the auxiliary pump 32 is turned off starting at t=2, as was the case with sample A. A comparison in the changes in power, i.e., arrows E1 and E2, shows a final change ($\Delta P_F$) that is approximately the same as that represented in sample A, i.e., the load change did not occur during the sample period and the data is not aliased, and can be used for further diagnosis of the auxiliary pump 32.

Sample C describes an example of an additional load change occurring during the sample period, resulting in aliased data. APM power output at point 270 is at a minimum with the auxiliary pump 32 off. At t0, the APM 28 output power is sampled and the auxiliary pump 32 is commanded on. Sometime after t0, but before t1, an additional load is turned on within the low voltage system of the HEV 10. Points 270 and 272 therefore represent the first and second data points measured with the auxiliary pump 32 turned on, and include an additional load on the APM 28 in conjunction with the auxiliary pump 32 load. The power off data points are likewise represented by points 274 and 276, when the auxiliary pump 32 is turned off starting at t=2, as was the case with samples A and B. The additional load turned on between t0 and t1 remains on. A comparison of arrows F1 and F2 of sample C shows a wide variance, which can result in a value of $\Delta P_F$>threshold, indicating aliased data. This test would not be used to determine pass or fail counts, but only to increment the sample counter.

As a numeric example, using the formula $P=V^2/R$, an APM voltage signal of 12 volts and an auxiliary pump 32 load resistance of 2 ohms produces an expected power-on difference ($\Delta P_{ON}$) of $(12^2)/2=72$ W. An exemplary permissible range of ±10% would provide a threshold of [64.8 W-79.2 W] for a pump drawing the expected load. If the value of the power-on difference ($\Delta P_{ON}$) falls below this range, the auxiliary pump 32 provides too high of a resistance, i.e., power draw is too low, or may even be disconnected, i.e., a first type of failure. If the value of $\Delta P_{ON}$ falls above this range, the auxiliary pump 32 provides too low of a resistance. Such a result could indicate an electrical short, or that the rotor of the auxiliary pump 32 is stalled, i.e., a second type of failure.

Using the algorithm 100 of FIG. 2 in conjunction with the HEV 10 of FIG. 1, the performance of the transmission auxiliary pump 32 can be diagnosed without requiring execution of an Auto Stop action. The algorithm 100 can be used aboard BAS-type hybrids wherein an A/C request state might otherwise prevent Auto Stop functionality and any pump diagnosis strategy that would ordinarily occur during an Auto Stop event. Conventional pressure switches tied to the position of the ignition key are eliminated, along with required packaging for such a switch. Likewise, the need to force an Auto Stop event in order to diagnose the pump is eliminated, so that customer expectations more closely match the vehicle operation.

While the best modes for carrying out the invention have been described in detail, those familiar with the art to which this invention relates will recognize various alternative designs and embodiments for practicing the invention within the scope of the appended claims.

The invention claimed is:

1. A method of diagnosing a transmission auxiliary pump in a hybrid electric vehicle (HEV) having an engine and an auxiliary power module (APM), the method comprising:
   detecting a predetermined HEV operating mode during which the engine is running;
   cycling the transmission auxiliary pump between an on state and an off state during the predetermined HEV operating mode;
   determining an electrical output value of the APM during each of the on state and the off state of the transmission auxiliary pump; and
   executing a control action when the electrical output value exceeds a corresponding calibrated threshold.

2. The method of claim 1, wherein determining an electrical output value of the APM includes calculating a first difference between a pair of power output values of the APM when the transmission auxiliary pump is in the on state and a second difference between a pair of power output values of the APM when the transmission auxiliary pump is in the off state.

3. The method of claim 2, wherein determining an electrical output value of the APM includes calculating a final absolute value difference between the first difference and the second difference.

4. The method of claim 1, wherein the HEV includes an air conditioning (AC) compressor, and wherein detecting a predetermined HEV mode includes detecting an active operation of the AC compressor.

5. The method of claim 1, wherein determining an electrical output value of the APM includes measuring an output voltage of the APM and an output current of the APM, and calculating an electrical output power of the APM using each of the output voltage and the output current of the APM.

6. The method of claim 1, wherein detecting a predetermined HEV operating mode includes one of: detecting an idling condition of the engine and detecting an active shut-down of the engine.

7. A method of diagnosing a transmission auxiliary pump in a hybrid electric vehicle (HEV) having an engine and an auxiliary power module (APM), the method comprising:
   detecting one of a plurality of predetermined HEV operating modes during which the engine is running, the plurality of predetermined HEV operating modes including an engine idle mode and an engine shut-down mode of the HEV;
   determining a first and a second output power value of the APM with the transmission auxiliary pump in an on state;
   calculating a power-on difference between the first and the second output power value of the APM;
   determining a third and a fourth output power value of the APM with the pump in an off state;
   calculating a power-off difference between the third and the fourth power value;
   calculating a final absolute value power difference between the power-on difference and the power-off difference; and
   executing a control action when the final absolute value power difference is less than a threshold confidence value and the power-on difference falls outside of a calibrated threshold range.

8. The method of claim 7, wherein executing a control action includes incrementing a diagnostic counter, including incrementing at least one of:
   a fail counter, a pass counter, and a sample counter.

9. The method of claim 8, the method further comprising:
   comparing a value of at least one of the sample counter, the failure counter, and the pass counter to a corresponding calibrated limit;
   wherein executing a control action further includes at least one of: passing a diagnostic fault code onboard the HEV, setting a diagnostic fault code onboard the HEV, clearing diagnostic fault code onboard the HEV, transmitting a diagnostic fault code to a remote location, illuminating an indicator device within the HEV when the fail counter exceeds the calibrated limit, and resetting at least one of the diagnostic counters.

10. The method of claim 7, wherein determining a first, a second, a third, and fourth output power value of the APM includes measuring each of a voltage output signal and a current output signal of the APM.

11. A hybrid electric vehicle (HEV) comprising:
   an engine;
   a transmission configured to receive an input torque from the engine;
   an auxiliary power module (APM);

an auxiliary battery that is electrically connected to the APM;

a transmission auxiliary pump operable for maintaining a pressure in the transmission when the engine is turned off; and an electronic control unit (ECU) configured for diagnosing an operation of the transmission auxiliary pump during a predetermined HEV operating mode during which the engine is running, including determining an electrical output value of the APM during the predetermined HEV operating mode;

wherein the ECU is configured for executing a control action when the electrical output value exceeds a calibrated threshold.

12. The vehicle of claim 11, further comprising an air conditioning (AC) compressor, wherein the predetermined HEV operating mode includes an active operation of the AC compressor.

13. The vehicle of claim 11, wherein the predetermined HEV operating mode is selected from the group consisting essentially of: an active shut-down of the HEV and an idling of the engine.

14. The vehicle of claim 11, further comprising a telematics unit, wherein the ECU is operable for transmitting a diagnostic fault code to a remote location via the telematics unit as part of the control action.

\* \* \* \* \*